US 6,697,147 B2

(12) United States Patent
Ko et al.

(10) Patent No.: US 6,697,147 B2
(45) Date of Patent: Feb. 24, 2004

(54) POSITION MEASUREMENT APPARATUS AND METHOD USING LASER

(75) Inventors: Won-Jun Ko, Suwon (KR); Soo-Sang Yang, Suwon (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 10/289,300

(22) Filed: Nov. 7, 2002

(65) Prior Publication Data

US 2004/0001197 A1 Jan. 1, 2004

(30) Foreign Application Priority Data

Jun. 29, 2002 (KR) .......................... 2002-37604

(51) Int. Cl.⁷ .......................... G01C 3/08; G01C 1/00; G01B 11/26; H04N 7/18; B06K 9/00
(52) U.S. Cl. ................. 356/4.03; 356/139.03; 356/152.2; 382/106; 702/159; 901/47; 348/140
(58) Field of Search ................ 356/152.1, 139.03, 356/152.2, 4.03; 348/135, 136, 142, 140; 702/159; 901/47, 46; 382/106

(56) References Cited

U.S. PATENT DOCUMENTS

| | | | | |
|---|---|---|---|---|
| 4,751,658 A | * | 6/1988 | Kadonoff et al. | 701/301 |
| 4,834,531 A | * | 5/1989 | Ward | 356/5.08 |
| 4,954,962 A | * | 9/1990 | Evans et al. | 701/28 |
| 5,633,718 A | * | 5/1997 | Manning | 356/613 |
| 5,731,870 A | * | 3/1998 | Bartko et al. | 356/139.09 |
| 5,929,784 A | * | 7/1999 | Kawaziri et al. | 340/903 |
| 6,088,106 A | * | 7/2000 | Rockseisen | 356/623 |
| 6,288,774 B1 | * | 9/2001 | Takubo et al. | 356/4.03 |
| 6,349,249 B1 | * | 2/2002 | Cunningham | 701/28 |
| 6,369,880 B1 | | 4/2002 | Steinlechner | |
| 6,392,744 B1 | * | 5/2002 | Holec | 356/4.03 |
| 6,400,451 B1 | * | 6/2002 | Fukuda et al. | 356/139.09 |
| 6,483,536 B2 | * | 11/2002 | Aoyama | 348/139 |

FOREIGN PATENT DOCUMENTS

FR 2630538 A * 10/1989 .......... G01B/11/03

* cited by examiner

Primary Examiner—Thomas H. Tarcza
Assistant Examiner—Brian K Andrea
(74) Attorney, Agent, or Firm—Staas & Halsey LLP

(57) ABSTRACT

A position measurement apparatus and method using laser includes a laser generating device, an image device, and a control unit. The laser generating device generates three or more laser beams progressing in parallel with each other at regular intervals. The image device obtains a picture for three or more points formed on a target by the laser beams. The control unit calculates a position relative to the target using number of pixels between pairs of neighboring ones of the three or more points in the picture. Thus, the present invention is advantageous in that laser pointers and a CCD camera having simple constructions and low prices are used, so that the position measurement apparatus is handled conveniently and is economical.

17 Claims, 8 Drawing Sheets a' = a" : SHORT DISTANCE a' = a" : LONG DISTANCE

POSITION MEASUREMENT APPARATUS AND METHOD USING LASER

CROSS-REFERENCE TO RELATED APPLICATION

This application claims the benefit of Korean Application No. 2002-37604, filed Jun. 29, 2002, in the Korean Industrial Property Office, the disclosure of which is incorporated herein by reference.

BACKGROUND OF THE INVENTION

1. Field of the Invention

The present invention relates generally to position measurement, and more particularly to the position measurement of a mobile object relative to a surrounding structure.

2. Description of the Related Art

Generally, in order to measure a precise distance, supersonic wave distance measurement apparatuses using electronic devices, distance measurement apparatuses using reflection waves of laser, etc., have been commercialized and used. The supersonic wave distance measurement apparatus uses an electromagnetic induction phenomenon or a piezoelectric phenomenon, and includes a wave transmitter and a wave receiver. If the wave transmitter emits supersonic waves, the wave receiver receives the supersonic waves that collide with a target to be measured and are reflected therefrom. In this case, a distance between the target and a mobile object is measured using a velocity of the supersonic waves, and a time taken to receive the supersonic waves from emission. The time taken to receive the supersonic waves from the emission is measured using a flip-flop. If the flip-flop is set when the wave transmitter emits the supersonic waves, and is reset when the wave receiver detects the reflected supersonic waves, a pulse having a width of time for supersonic waves to be returned after being emitted is generated. By measuring this pulse, the time is obtained. However, the accuracy of the supersonic wave distance measurement apparatus is greatly decreased due to a diffused reflection at a bending surface. Furthermore, the supersonic wave distance measurement apparatus is problematic in that it is weak in a noisy environment, and real time measurement of precise distances is difficult.

The laser distance measurement apparatuses are classified into various types, which use phase variation of reflection waves, pulses, and received light from reflection waves by triangulation. The type using the pulses emits a single pulse or a series of pulses, which are coherent light, toward a target. These pulses are scarcely dispersed to such an extent that a diameter of the pulses expands to only about 1 m after the light travels a distance of several kilometers. Once the light reaches the target, it is dispersed in many directions. However, some energy is returned to the laser distance measurement apparatus and detected. The laser distance measurement apparatus determines a distance between a mobile object and the target by measuring a time taken for the pulses to be reflected and returned.

The laser distance measurement type using triangulation is an apparatus that emits laser beams, detects light reflected from a target with a laser light receiving sensor, detects a laser emission angle, and measures a distance between a mobile object and the target via triangulation. However, the laser distance measurement type using the triangulation is problematic in that a laser output must be great, a sensitivity of the light receiving sensor must be excellent, and a circuit construction of the light receiving sensor is extremely complicated, thus increasing cost of products. Further, the type using the triangulation is problematic in that it requires extreme caution in handling of the laser distance measurement apparatus, thus it is not practical.

SUMMARY OF THE INVENTION

Accordingly, it is an object of the present invention to provide a position measurement apparatus and method using laser, which measures a distance and an angle with relatively high precision using inexpensive equipment.

Additional objects and advantages of the invention will be set forth in part in the description which follows and, in part, will be obvious from the description, or may be learned by practice of the invention.

The foregoing and other objects of the present invention are achieved by providing a position measurement apparatus using laser including a laser generating device to generate three or more laser beams progressing in parallel with each other at regular intervals, an image device to obtain a picture for three or more points formed on a target by the laser beams, and a control unit to calculate a position relative to the target using numbers of pixels between pairs of neighboring ones of the three or more points in the picture.

The foregoing and other objects of the present invention are achieved by providing a method including generating three or more laser beams progressing in parallel with each other at regular intervals, obtaining a picture for three or more points formed on a target by the laser beams, and calculating an angle between each of the laser beams and the target, and a distance between an image device to obtain the picture and the target using numbers of pixels between pairs of neighboring ones of the three or more points in the picture.

BRIEF DESCRIPTION OF THE DRAWINGS

The above and other objects and advantages of the present invention will become apparent and more appreciated from the following detailed description of the preferred embodiments, taken in conjunction with the accompanying drawings of which.

DETAILED DESCRIPTION OF THE PREFERRED EMBODIMENTS

Figure 1A:
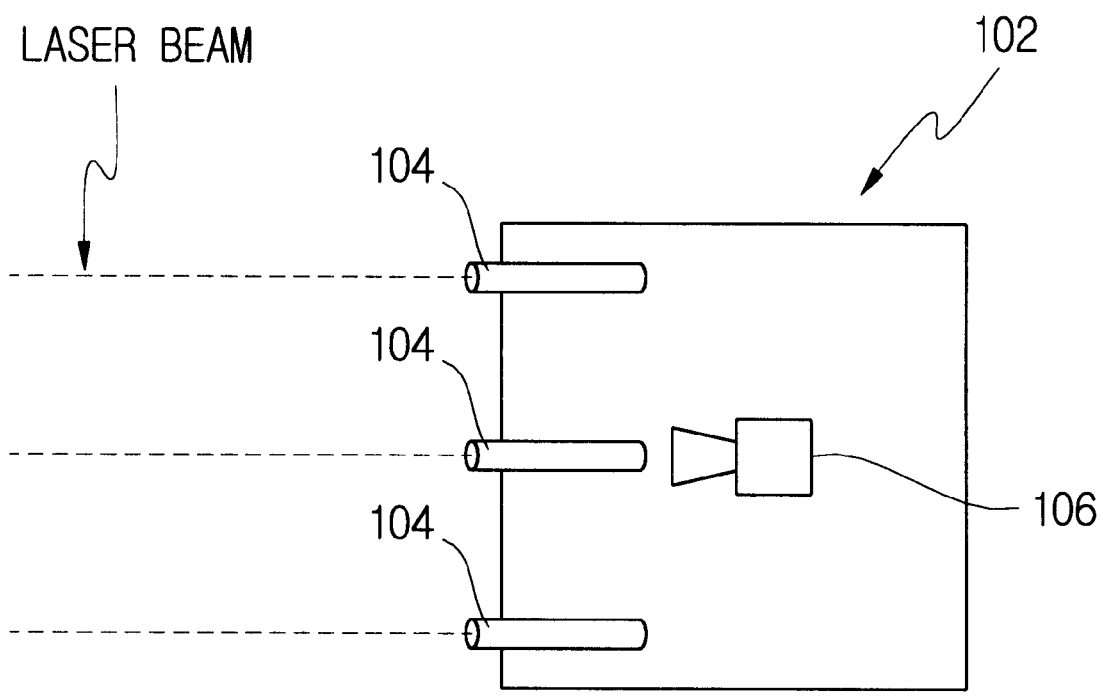
FIG. 1A is a plan view of a position measurement apparatus using laser, according to an embodiment of the present invention.

Reference will now be made in detail to the present preferred embodiments of the present invention, examples of which are illustrated in the accompanying drawings, wherein like reference numerals refer to like elements throughout FIG. 1A is a plan view of a position measurement apparatus using a laser, according to an embodiment of the present invention. As shown in FIG. 1A, a laser position measurement apparatus 102 of the present invention includes three laser pointers 104, and a charged coupled device (CCD) camera 106. The three laser pointers 104 are installed at regular intervals, and generate three laser beams parallel with each other. The CCD camera 106 obtains a picture by photographing three points formed by the three laser beams on a surface (not shown). The CCD camera 106 is installed such that a point formed by a center one of the three laser pointers 104 is displayed at a center position on a screen (not shown). A resolution of the CCD camera 106 is one of many factors used to precisely measure angle and distance. According to the present invention, the resolution of the CCD camera 106 is selected according to required precision.

Figure 1B:
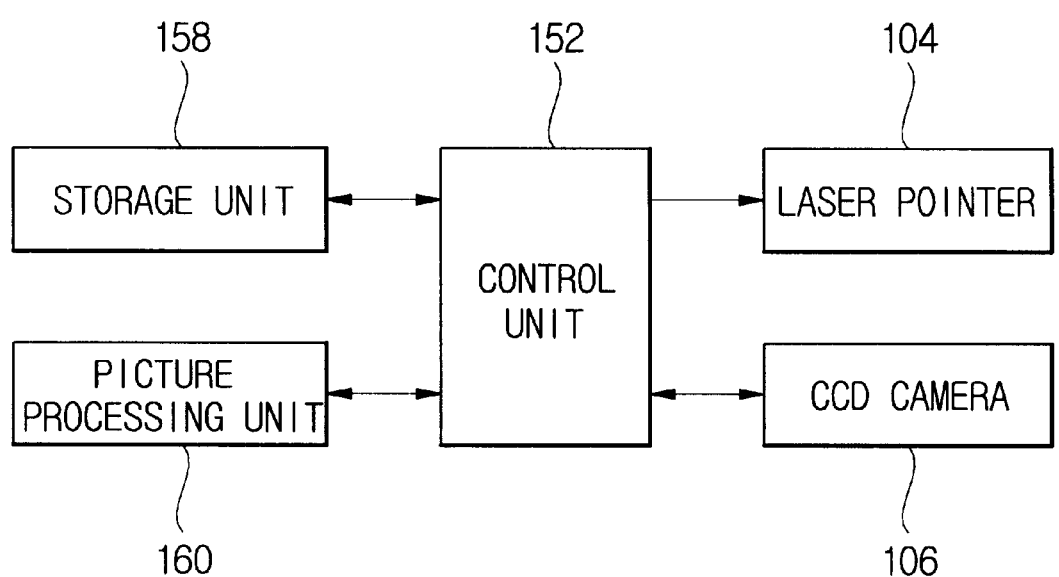
FIG. 1B is a block diagram of the position measurement apparatus using laser according to the present invention.

FIG. 1B is a block diagram of the position measurement apparatus using the laser according to the present invention. As shown in FIG. 1B, a control unit 152 controls the laser pointers 104 to generate the laser beams, and controls the CCD camera 106 to obtain the picture of the points formed by the laser beams on the surface (not shown). Data of the picture obtained by the CCD camera 106 are stored in a storage unit 158 and used when the control unit 152 calculates the angle and the distance. A picture processing unit 160 extracts only position information of the points formed by the laser beams from the picture by filtering the picture obtained by the CCD camera 106.

Figure 2A:
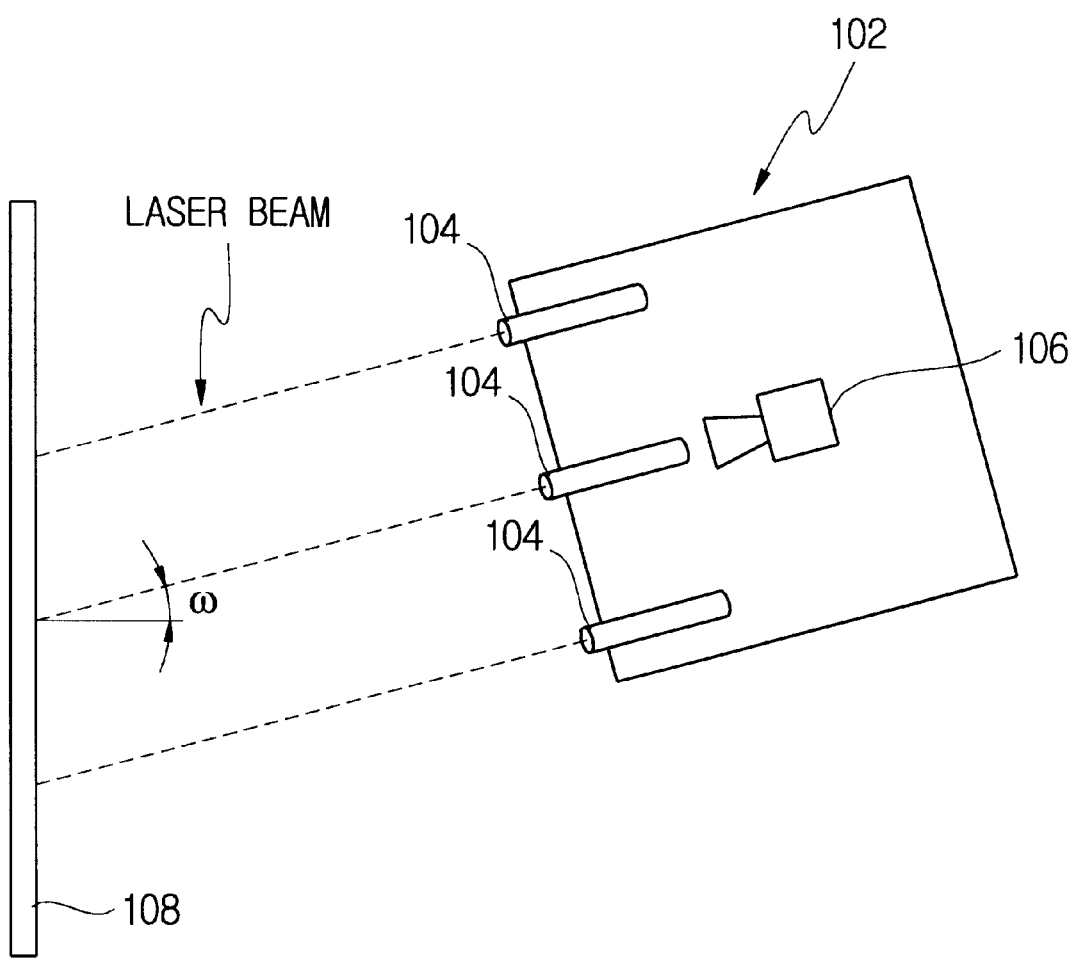
FIG. 2A is a view showing a concept of angle measurement of the position measurement apparatus using laser according to the present invention;.

FIG. 2A is a view showing a concept of angle measurement of the position measurement apparatus using laser according to the present invention. As shown in FIG. 2A, provided that the angle between each of the laser beams generated by the position measurement apparatus 102 and a normal of a wall surface 108 is ω, each of the laser beams is perpendicular to the wall surface 108 if ω=0. However, if ω≠0, each of the laser beams and the normal of the wall surface 108 forms a certain angle therebetween. Therefore, when ω≠0, a rotation angle becomes equal to the angle ω if the position measurement apparatus 102 is rotated such that ω=0 is satisfied. Accordingly, the angle ω is calculated using the above relations. A principle of making ω=0 by rotating the position measurement apparatus 102 is described with reference to FIG. 2B.

Figure 2B:
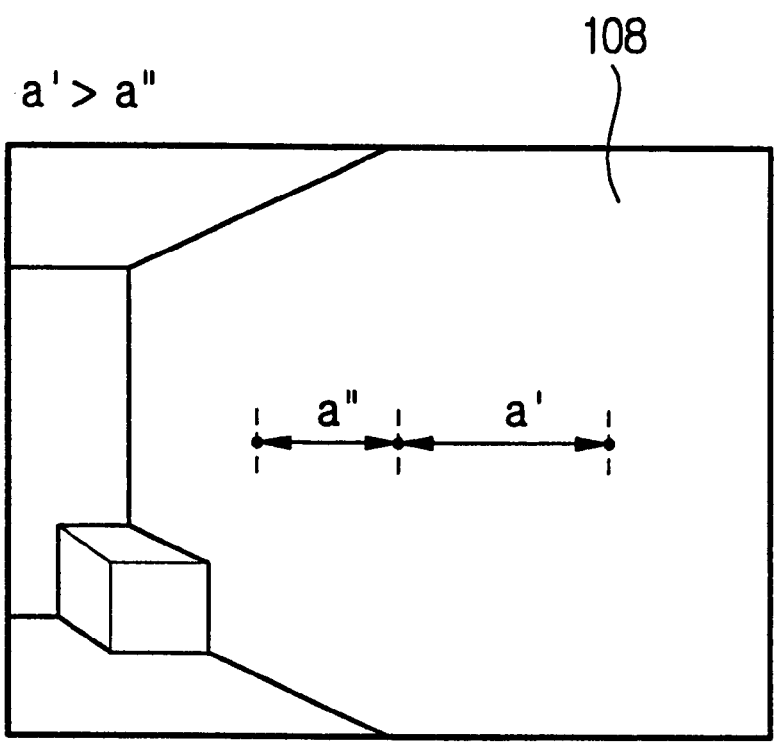
FIGS. 2B and 2C are views showing pictures obtained to measure an angle in the position measurement apparatus using laser according to the present invention.
Figure 2C:
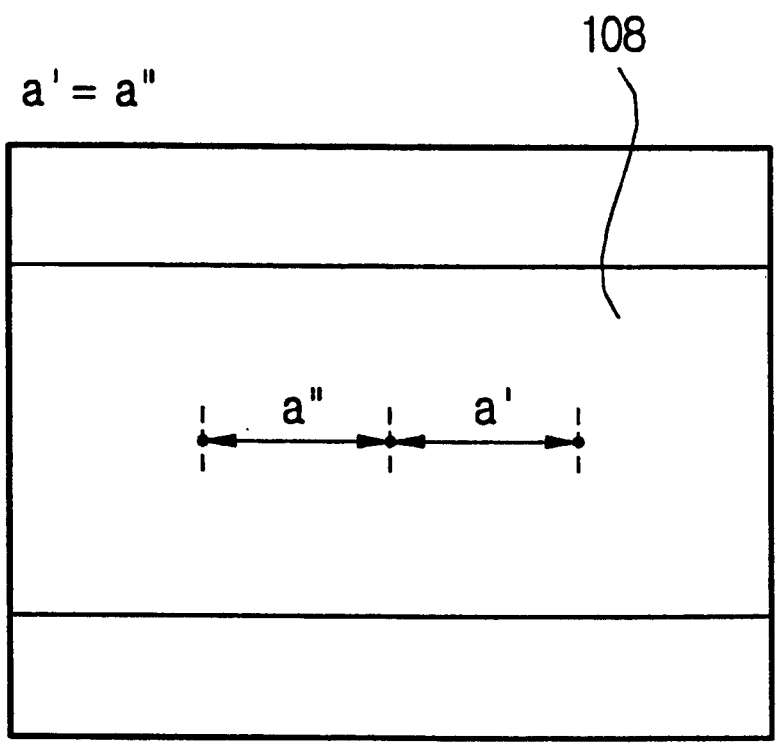

FIGS. 2B and 2C are views showing pictures obtained to measure an angle in the position measurement apparatus using laser according to the present invention. In FIG. 2B, a picture is obtained by the CCD camera 106 where ω≠0. As shown in the picture of FIG. 2B, since the three laser beams are not perpendicular to the wall surface 108, distances between pairs of neighboring ones of the three points generated by the laser beams are not the same. That is, on the basis of a center point, a left point is closer to the center point than a right point. Thus, the picture of FIG. 2B shows that distance a' is longer than distance a''. In the picture of FIG. 2B, the distances a' and a'' are values obtained using numbers of pixels in the picture.

In the state of FIG. 2B, the wall surface 108 may be perpendicular to the laser beams by allowing a'=a'' to be realized while the position measurement apparatus 102 is rotated. In FIG. 2C, a picture is obtained after the laser beams are allowed to be perpendicular to the wall surface 108 by rotating the position measurement apparatus 102 such that a'=a'' is satisfied. If the wall surface 108 and the laser beams are perpendicular to each other, the distance between the wall surface 108 and the position measurement apparatus 102 is measured.

Figure 3A:
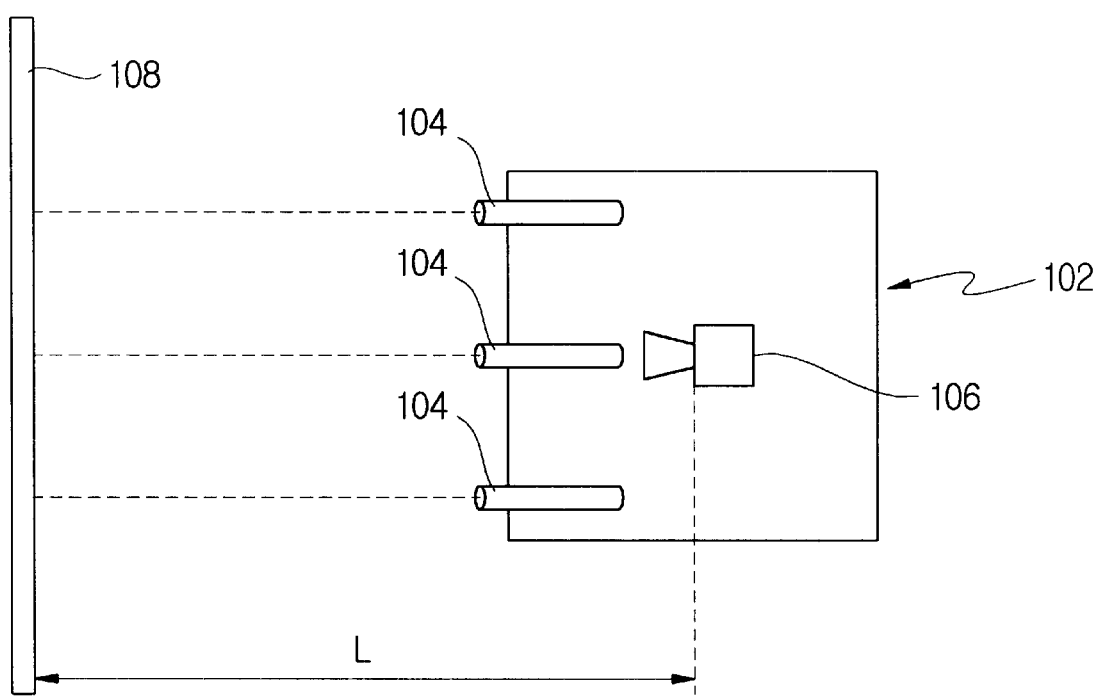
FIG. 3A is a view showing a concept of distance measurement of the position measurement apparatus using laser according to the present invention.

3A is a view showing a concept of distance measurement of the position measurement apparatus using laser according to the present invention. As shown in FIG. 3A, an actual distance L between the wall surface 108 and the CCD camera 106 is obtained by emitting the laser beams perpendicularly to the wall surface 108, and calculating distances between pairs of neighboring ones of three points in the picture obtained by the CCD camera 106. A principle of distance measurement of the above-described position measurement apparatus of the present invention is described with reference to FIGS. 3B and 3C.

Figure 3B:
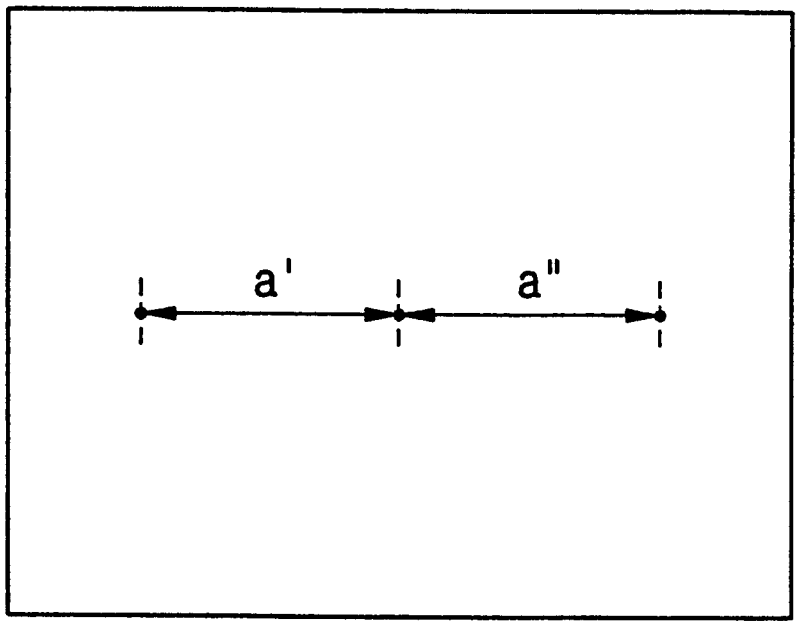
FIGS. 3B and 3C are views showing pictures obtained to measure a distance in the position measurement apparatus using laser according to the present invention.
Figure 3C:
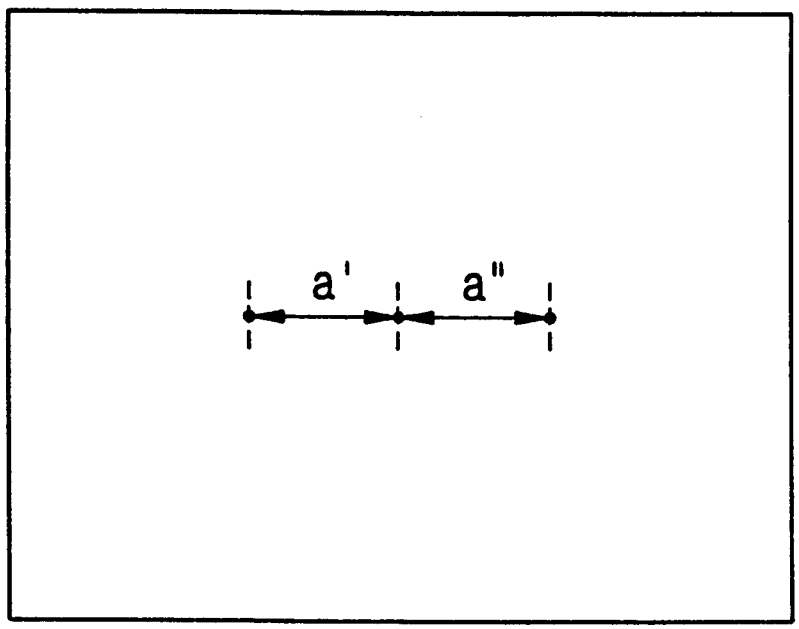

FIGS. 3B and 3C are views showing pictures obtained to measure a distance in the position measurement apparatus using laser according to the present invention. FIG. 3B shows a short distance picture, and FIG. 3C shows a long distance picture. When the short distance picture of FIG. 3B and the long distance picture of FIG. 3C are compared, it is shown that a distance a' in the short distance picture of FIG. 3B is longer than the distance a' in the long distance picture of FIG. 3C. The distance a' is obtained using the number of pixels of the picture. Here, an actual distance between the CCD camera 106 and the wall surface 108 is obtained by the following Equation (1) if an actual distance per unit pixel is known.

$$L = k \frac{1}{x-b} \quad (1)$$

In Equation (1), L is the distance between the CCD camera 106 and the wall surface 108, x is a sum of a'+a'' of distances between pairs of neighboring points in the picture (or a sum of the numbers of pixels between pairs of neighboring points in the picture), and k and b are constants. The constants k and b are values obtained from data based on two or more experiments taken to calculate the actual distance per unit pixel.

As indicated in Equation (1), the distance L between the wall surface 108 and the CCD camera 106 is in inverse proportion to the sum a'+a'' of distances between pairs of neighboring ones of the three points in the picture. That is, as the number of pixels corresponding to the distance a' in the picture is small, the distance L between the CCD camera 106 and the wall surface 108 is greater. On the contrary, as the number of pixels corresponding to the distance a' in the picture is large, the distance L between the CCD camera 106 and the wall surface 108 is shorter.

Figure 4:
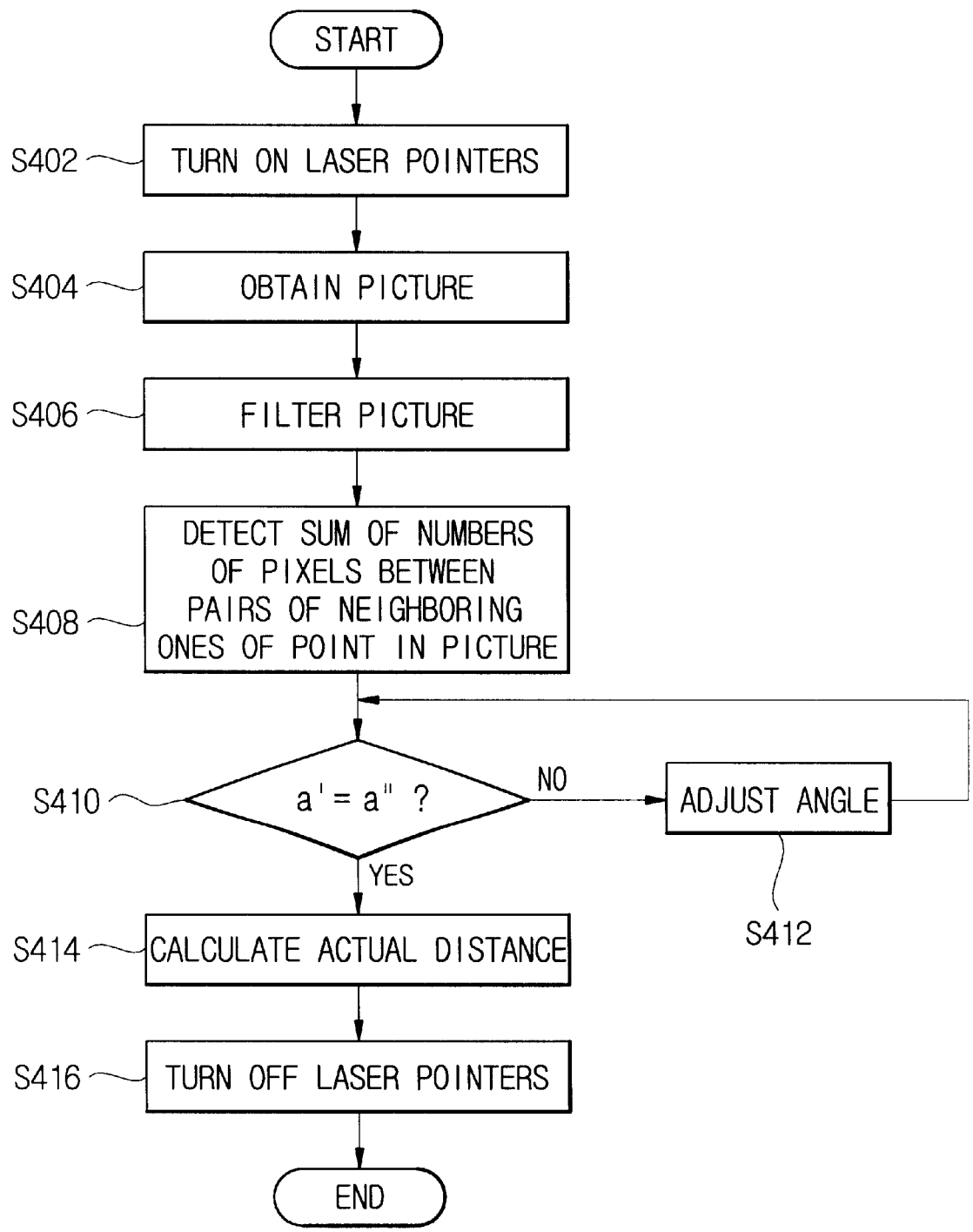
FIG. 4 is a flowchart of a position measurement method performed by the position measurement apparatus using laser according to the present invention.

FIG. 4 is a flowchart of a position measurement method performed by the position measurement apparatus using laser according to the present invention. As shown in FIG. 4, in order to measure a position by the position measurement apparatus using the laser of the present invention, the laser pointers 104 are turned on to generate the laser beams at operation S402. The picture for three pointers formed on the wall surface 108 by the CCD camera 106 is obtained at operation S404. The obtained picture is filtered, such that only position information of the three laser points is extracted at operation S406. The numbers of pixels between pairs of neighboring ones of the three points are detected at operation S408, and respective distances a' and a" between neighboring points are compared at operation S410. If a'=a", the actual distance L between the COD camera 106 and the wall surface 108 is calculated using the Equation (1) as described above, and the laser pointers 104 are then turned off. However, if a'≠a", the angle of the position measurement apparatus 102 is adjusted, such that a'=a" is satisfied at operation S412. Thereafter, the operation S410 of comparing a' and a" is repeated until a'=a" at which point the actual distance is calculated in operation S414.

Figure 5:
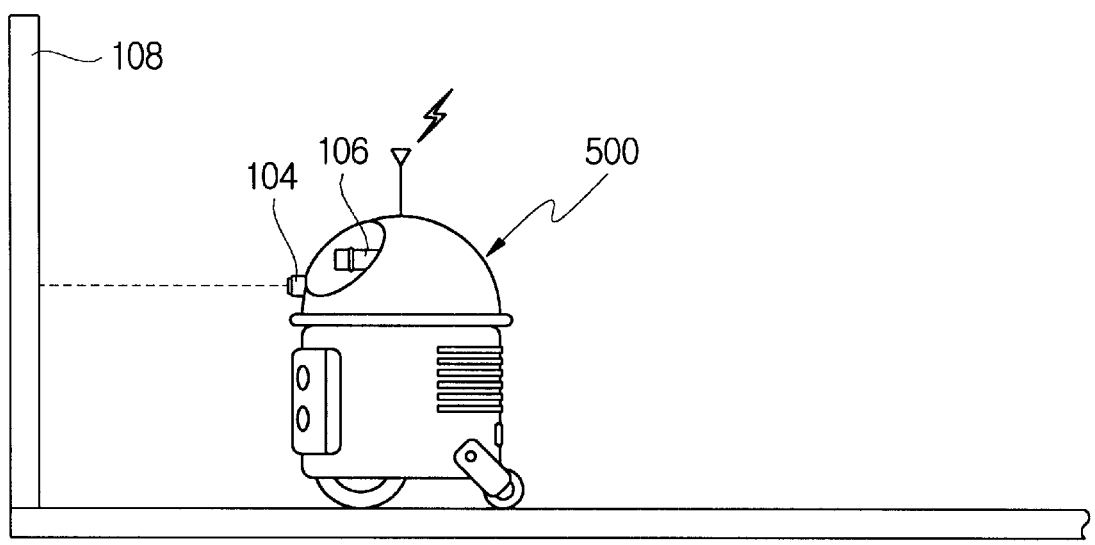
FIG. 5 is a view showing an example of a mobile robot employing the position measurement apparatus using laser according to the present invention.

The above-described position measurement apparatus according to the present invention is applied to mobile robots used in industry applications or home applications to allow the mobile robots to measure their relative positions to surrounding environments (structures, furniture, mechanical devices, etc.). FIG. 5 is a view showing an example of a mobile robot employing the position measurement apparatus using laser according to the present invention. As shown in FIG. 5, the laser pointers 104 and the CCD camera 106 are mounted on a mobile robot 500, and a relative position of the mobile robot 500 to the wall surface 108 is measured, thus enabling position control of a mobile robot in home or industry applications. A similar use can be adapted for other applications, such as collision avoidance systems in vehicles (such as automobiles).

As described above, the present invention provides a position measurement apparatus and method using laser, which obtains a relative position of a mobile object to a target by measuring its relative angle and distance to the target, such as, for example, a wall surface. Thus, the present invention uses laser pointers and a CCD camera which have simple constructions and low prices, so that the position measurement apparatus is handled conveniently and is economical. Further, the present invention is advantageous in that, since its position measurement algorithm is simple, the load of an entire position measurement system is reduced. Also, since a position measurement time is shortened due to the reduction of load, position measurement may be performed in real time. Also, the present invention is advantageous in that, since it ascertains positions of points by filtering a picture obtained by photographing laser points, position measurement may be performed at night. Additionally, while disclosed as being parallel, it is understood that the lasers adjacent to a central laser need not be parallel to the central laser but may be angled at roughly equal angels, so that the rotation and actual distance operations are equivalently performed Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A position measurement apparatus, comprising:
   a laser generating unit to generate three or more laser beams progressing in parallel with each other at regular intervals;
   an image unit to obtain a picture for three or more points formed on a target by the laser beams; and
   a control unit to calculate a position relative to the target using numbers of pixels between pairs of neighboring ones of the three or more points in the picture.

2. The position measurement apparatus according to claim 1, wherein the laser generating unit comprises:
   laser pointers installed to allow the three or more points to be positioned on a straight line.

3. The position measurement apparatus according to claim 2, wherein a point formed by a center one of the laser pointers is displayed at a center position on a screen of the position measurement apparatus.

4. The position measurement apparatus according to claim 1, wherein the image unit is configured so that a focus thereof is set to be in a same direction as an indicating direction of the laser pointers.

5. The position measurement apparatus according to claim 1, wherein the control unit detects the numbers of pixels between pairs of neighboring ones of the three or more points, and calculates an actual distance between the target and the image unit using the numbers of pixels obtained by the detection if the numbers of pixels are the same.

6. The position measurement apparatus according to claim 5, wherein the actual distance between the target and the image unit device is calculated by the following Equation:

$$L = k\frac{1}{x-b}$$

where L is the actual distance between the target and the image unit device, x is a sum of the numbers of the pixels between the pairs of neighboring ones of three points in the picture, and k and b are constants.

7. The position measurement apparatus according to claim 1, further comprising:
   a picture processing unit to detect position information of the points by filtering the picture, wherein the control unit measures the relative position using the position information detected by the picture processing unit.

8. The position measurement apparatus according to claim 1, wherein the position measurement apparatus is mounted on a mobile robot to measure a relative position of the mobile robot to a surrounding target.

9. A position measurement method, comprising:
   generating three or more laser beams progressing in parallel with each other at regular intervals;
   obtaining a picture for three or more points formed on a target by the laser beams; and
   calculating an angle between each of the laser beams and the target, and a distance between an image device to obtain the picture and the target using numbers of pixels between pairs of neighboring ones of the three or more points in the picture.

10. The position measurement method according to claim 9, wherein the calculating comprises:
    detecting the numbers of pixels between the pairs of neighboring ones of the three or more points; and
    calculating the distance between the target and the image device using the numbers of pixels obtained by the detection if the numbers of pixels are the same.

11. The position measurement method according to claim 10, wherein the distance between the target and the image device is calculated by the following Equation:

$$L = k\frac{1}{x-b}$$

where L is the distance between the image device and the target, x is a sum of the numbers of pixels between the pairs of neighboring ones of three points in the picture, and k and b are constants.

12. The position measurement method according to claim 9, wherein the calculating is performed so that position measurement is executed by detecting position information of the points by filtering the picture.

13. A position measurement method, comprising:

obtaining a picture of points provided on a target on which lasers are incident; and measuring a position of a mobile object relative to an angle and a distance of the mobile object to the target using numbers of pixels between the points in the picture.

14. The method according to claim 13, wherein the measuring of the position of the mobile object is performed in real time.

15. An apparatus comprising:

a motor controllable to move the apparatus;

lasers to generate laser beams;

an image unit to obtain a picture of laser points formed on a target by the laser beams; and a control unit to calculate a position of the apparatus relative to the target using numbers of pixels between the laser points shown in the picture, and to control the motor to move the apparatus in accordance with the calculated position.

16. A computer readable medium encoded with processing instructions for implementing a position measurement method performed by a computer, the method comprising:

obtaining a picture of points provided on a target on which lasers are incident; and measuring a position of a mobile object relative to an angle and a distance of the mobile object to the target using numbers of pixels between the points in the picture.

17. An apparatus comprising:

first and second lasers to generate first and second laser beams to be incident on a target;

an image unit to obtain a picture of points formed on a target by the first and second laser beams;

a rotation correction unit which rotates the image unit such that an average path of the first and second laser beams is perpendicular to the target; and a control unit to calculate a position relative to the target using numbers of pixels between the points in the picture.

* * * * *